(12) United States Patent
Coury et al.

(10) Patent No.: US 6,432,380 B1
(45) Date of Patent: Aug. 13, 2002

(54) SYNTHESIS OF ALUMINOSILICATES VIA COFEEDING AN ALKALI METAL ALUMINATE AND SODIUM SILICATE AND COFEEDING APPARATUS THEREFOR

(75) Inventors: Joseph E. Coury, Friendswood; Wylie A. Barrow, Sugarland; Yongzhuo Su, Houston; George W. Cook, Jr., Pasadena; Robert F. Pierpoline, Houston, all of TX (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 09/657,830

(22) Filed: Sep. 8, 2000

(51) Int. Cl.⁷ ............................................... C01B 39/02
(52) U.S. Cl. ....................................................... 423/700
(58) Field of Search .......................................... 423/700

(56) References Cited

U.S. PATENT DOCUMENTS

| | | |
|---|---|---|
| 4,073,867 A | 2/1978 | Roebke et al. |
| 4,217,240 A | 8/1980 | Bergna |
| 4,219,406 A | 8/1980 | Kuehl et al. |
| 4,248,847 A | 2/1981 | Derleth et al. |
| 4,263,266 A | 4/1981 | Michel et al. |
| 4,267,158 A | 5/1981 | Christophliemk et al. |
| 4,275,048 A | 6/1981 | Stein et al. |
| 4,278,649 A | 7/1981 | Christophliemk et al. |
| 4,303,627 A | 12/1981 | Strack et al. |
| 4,314,979 A | 2/1982 | Deabriges |
| 4,368,174 A * | 1/1983 | Valyocsik |
| 4,374,093 A | 2/1983 | Rollmann et al. |
| 4,587,115 A * | 5/1986 | Arika et al. |
| 4,661,334 A | 4/1987 | Latourette et al. |
| 4,732,880 A | 3/1988 | Ugo et al. .................... 502/62 |
| 5,487,882 A * | 1/1996 | Hu et al. |
| 5,616,310 A | 4/1997 | Edwards et al. ............ 423/700 |
| 5,904,914 A | 5/1999 | Araya ........................ 423/700 |
| 6,096,820 A | 8/2000 | Lockledge et al. |

FOREIGN PATENT DOCUMENTS

| | | |
|---|---|---|
| EP | 0357989 | 3/1990 |
| EP | 0569626 | 11/1993 |
| WO | 0015553 | 3/2000 |
| WO | 0015709 | 3/2000 |

* cited by examiner

*Primary Examiner*—David Sample
(74) *Attorney, Agent, or Firm*—E. E. Spielman, Jr.

(57) ABSTRACT

Synthetic zeolite is produced by force feeding separate aqueous streams of sodium silicate and of an alkali metal aluminate into coaxial alignment with each other. The coaxially aligned solutions are then introduced into in an open space in coaxial fashion with one of the streams being injected from a nozzle. The open space constitutes a mixing zone in which the two streams come together and are thoroughly mixed to produce a precrystallized mixture. This mixture then passes in unimpeded fashion through an entrance port and into a crystallization reactor or vessel. The system used for conducting this operation thus serves the dual function of being a feeding system and a mixing system whereby the silicate and aluminate streams interact with each other before entering the crystallization reactor or zone. Intimate mixing is assured by virtue of the relatively small volume of the mixing zone and the higher velocity of the stream emanating from the nozzle.

25 Claims, 2 Drawing Sheets

SYNTHESIS OF ALUMINOSILICATES VIA COFEEDING AN ALKALI METAL ALUMINATE AND SODIUM SILICATE AND COFEEDING APPARATUS THEREFOR

BACKGROUND

Synthetic aluminosilicates are normally produced via sequential addition of an alkali metal aluminate and sodium silicate raw materials at a temperature below that which induces crystallization. This sequential addition precludes optimal stoichiometric conditions for pre-crystallization reactions especially when using a single, large crystallization vessel or reactor for the mixing of the raw materials.

Synthetic aluminosilicates such as zeolite-A having substantially uniform relatively small particle size is a an important industrial product with a variety of uses. Heretofore a process designed to provide such a product was attempted in which separate feed streams of aqueous sodium silicate and aqueous sodium aluminate were brought together at right angles to each other to form a stream which was passed vertically down through a pair of orifices to ensure good mixing, and through a carbon steel duct or conduit into the reactor in which the product was crystallized. While this process and feeding arrangement was operable, unfortunately the particle size uniformity was not as good as desired, and the mean particle size tended to be larger than desired. In addition, a considerable amount of caking and hangup of product took place in the feed system described.

After considerable experimentation a feed system and a set of operating parameters have been developed which are deemed to overcome the shortcomings of the previously tested feed system. This new feed system enables successful operation using large reactors, while at the same time achieving the production of synthetic zeolite product meeting a uniform mesh particle size specification without sacrifice of product quality in terms of calcium depletion rate, calcium exchange capacity, and water adsorption capability. Indeed, it is conceivable that the new technology of this invention will not only reduce mesh size significantly and uniformly, but in addition may allow for increased zeolite product quality.

SUMMARY OF THE INVENTION

In accordance with this invention the feed streams are mixed together using a cofeed system that provides a more homogenous small volume mixture that enters a larger crystallization vessel or reactor in the proper "reaction geometry" and in an unimpeded fashion. These conditions minimize the formation of an incorrect mixture where unreacted raw materials can act as particulate binder leading to high mesh product. Consequently, a higher purity product is formed with high performance characteristics such as high water adsorption capability and/or high alkaline earth metal exchange capacity.

More particularly, synthetic zeolite is produced by force feeding separate aqueous streams of sodium silicate and of an alkali metal aluminate into coaxial alignment with each other. The coaxially aligned solutions are then introduced into in an open space in coaxial fashion with one of the streams being injected from a nozzle. The open space constitutes a mixing zone in which the two streams come together and are thoroughly mixed to produce a precrystallized mixture. This mixture then passes in unimpeded fashion through an entrance port and into a crystallization reactor or vessel. The system used for conducting this operation thus serves the dual function of being a feeding system and a mixing system whereby the silicate and aluminate streams interact with each other before entering the crystallization reactor or zone. Intimate mixing is assured by virtue of the relatively small volume of the mixing zone and the higher velocity of the stream emanating from the nozzle.

Among the advantages of this invention is that it enables the feeding of the two aqueous streams at elevated temperatures so that they come together and mix with each other while at an elevated temperature. This in turn enables shorter processing cycling times since the use of preheated incoming streams avoids the need for heating up a large volume of a precrystallization mixture within a large crystallization reactor or vessel.

In another of its embodiments this invention provides a process of producing a synthetic zeolite from a sodium silicate and an alkali metal aluminate. The process comprises cofeeding a stream of an aqueous sodium silicate and an aqueous stream of an alkali metal aluminate concentrically into an enclosed space constituting a mixing zone. Preferably the walls defining the mixing zone are vertically disposed or substantially vertically disposed, and the mixing zone is defined by a cylindrical wall such as the interior of a pipe or conduit. The mixing zone leads directly to a port or other opening in a reactor or vessel in which the zeolite is crystallized. This cofeeding is conducted such that (i) sodium silicate and alkali metal aluminate are mixed together and form a precrystallization mixture of uniform or substantially uniform composition in the mixing zone before passing into the reactor, and (ii) the resultant precrystallization mixture enters the reactor as an unimpeded flow. By "unimpeded flow" is meant that there is an open, unrestricted flow path (preferably a downward flow path) from the mixing zone which preferably is proximate to the cylindrical flange or other member defining the entrance into the reactor or vessel in which the crystallization occurs. Preferably, the entrance port is disposed at the top of the crystallization reactor or vessel, but in any event it is preferred that the diameter of the entrance port in such reactor or vessel be at least as large as the inner diameter of the mixing zone so that there is no shelf to impede the flow of precrystallization mixture into the reactor or vessel.

In the above process it is preferred that one of the above streams is injected vertically or substantially vertically downwardly into the mixing zone from a locus at or above the top of the mixing zone, and centrally disposed relative to the mixing zone. While either such stream can be the one that is injected in this manner, preferably the aqueous sodium silicate stream is the stream that is the so-injected stream.

Another embodiment of this invention is apparatus for feeding a solution of a sodium silicate and a solution of an alkali metal aluminate to a reactor or vessel in which the zeolite is crystallized. Such apparatus comprises:

a) a vertical or substantially vertical cylindrical conduit having a lower end and an outer diameter;

b) a nozzle having an upper end and a lower end and wherein the upper end of the nozzle is connected to the lower end of the conduit;

c) a control valve disposed in said conduit at a locus above the upper end of the nozzle;

d) a cylindrical duct having an upline section contiguous with a downline section, and a lower end portion, at least said downline section having an inner diameter greater than the outer diameter of the conduit, said downline section being coaxially aligned with said conduit and extending downwardly vertically or substantially vertically from the lower end of said nozzle to define a cylindrically enclosed open space terminating at the lower end portion of the duct, said lower end portion being adapted to connect with and form an unimpeded passage into an upper portion of said reactor or vessel, said upline section extending at a 0° to 90° angle relative to the vertical or substantially vertical cylindrical conduit, said upline section having a control valve disposed therein at a locus remote from said downline section.

It will be understood and appreciated that portions of the above-described apparatus are referred to individually. Even so, such portions in at least some cases can be in the form of a single unitary member or they can be composed of individual sub-units or elements which are connected together as by means of a threadable connection or the like. For example the conduct and the nozzle can be separate parts which are screwed, welded or otherwise bonded together to form a single entity, or they can be a unitary member to begin with. Similarly the contiguous upline section and downline sections can be a single unitary member i.e., a single straight duct or a duct bent at an angle of up to about 90° from the axis of the original duct. Alternatively, the duct can be composed for example of a pair of straight ducts which are joined together by an elbow duct at an angle of up to about 90° from the axis of one of the ducts.

The above and other embodiments and features of this invention will be still further apparent from the ensuing description, the appended claims, and the accompanying drawings.

FURTHER DETAILED DESCRIPTION

Figure 1:
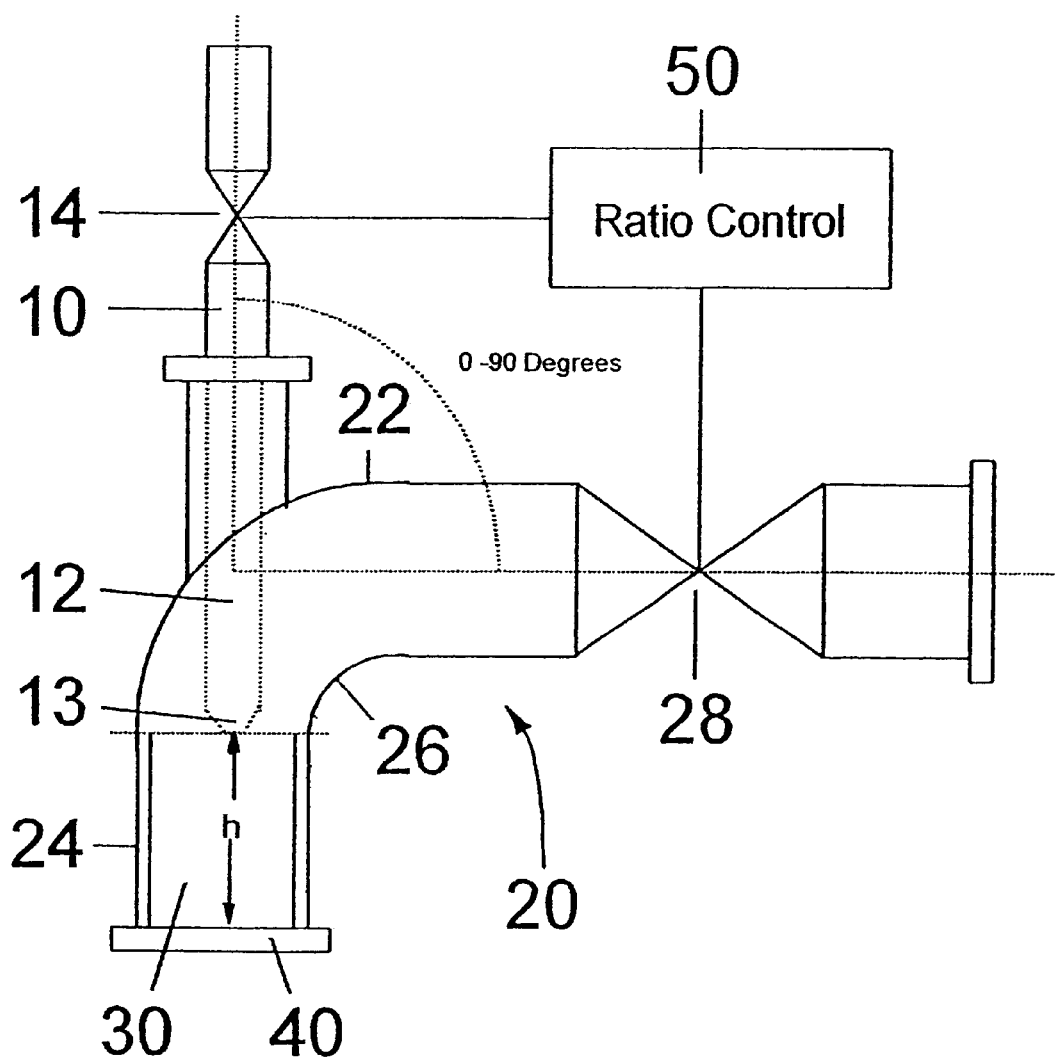
FIG. 1 schematically depicts in side view a preferred cofeeding system of this invention.

For best results, it is preferred to place the feeding/mixing apparatus of this invention above a feed port or other entranceway into the crystallization reactor or vessel. In this way the feeds are downward in a vertical or substantially vertical direction and the precrystallization mixture moves through the mixing zone and enters the feed port downwardly in a vertical or substantially vertical direction. However it is possible to position the feeding/mixing apparatus so that these feeds and flows are directions other than vertical or substantially vertical as long as the mixing in the mixing zone is thorough enough to result in the production of a finished zeolite product meeting the desired particle size and particle size distribution parameters. Thus it is deemed possible to position the feed apparatus so that these feeds and flows are, say, horizontal, or downwardly at an angle between horizontal and vertical.

As used herein, including the claims, and in connection with preferred embodiments, the term "substantially vertically disposed" or terms of similar import denote that the interior cylindrical wall of the upstanding duct that defines the mixing zone need not be absolutely vertical, but instead it can be inclined from vertical to a limited extent as long as the tilt has no material adverse effect upon the mixing in the mixing zone or upon the downward flow in the mixing zone. A numerical value could be meaningless as the amount of allowable tilt can be influenced by the composition of the particular precrystallization mixture being formed in the mixing zone, the temperature in the mixing zone, the diameter of the mixing zone, and so on. Thus most preferably one should try to keep the interior cylindrical wall of the upstanding duct that defines the mixing zone vertical or close to vertical to ensure achievement of excellent results.

Likewise, as used in this specification and in the claims, the term "substantially uniform composition" denotes that the composition of the precrystallization mixture need not be absolutely uniform throughout the mixing zone. Instead there can be some variation in precrystallization mixture composition so long as the variation in composition of the precrystallization mixture leaving the mixing zone and entering the crystallization reactor or vessel is not large enough to result in the formation of a finished zeolite product that does not possess the desired small mean particle size or meet the other specifications for the particular aluminosilicate product being produced. Here again, a numerical value of variability in composition could be meaningless as the amount of allowable variability can be influenced by such factors as the composition of the particular precrystallization mixture being formed in the mixing zone, and the characteristics desired in the finished product. Thus one should try to design and operate the particular system to provide intimate mixing in the mixing zone, but if the amount of variability in composition in a given situation causes no real harm, let it be. This is simply a matter of using common sense. While on matters of common sense, it will be understood and appreciated that mixing need not occur throughout the entire height or length of the mixing zone, although typically this tends to occur. It is sufficient that the difference in velocities of the incoming streams provides enough mixing that a precrystallization mixture of uniform or substantially uniform composition leaves the mixing zone and enters the crystallization reactor or vessel.

Referring now to FIG. 1, the preferred feeding system depicted includes conduit 10 terminating at its lower end in nozzle 12, and having therein control valve 14 at a locus above and remote from the nozzle. In the form depicted, cylindrical duct 20 is composed of a horizontal upline section 22, a vertical downline section 24, and a 90° elbow section 26, downline section 24 having an inner diameter greater than the outer diameter of conduit 10. In addition, downline section 24 is coaxially aligned with conduit 10 and nozzle 12, and extends downwardly from the lower end of nozzle 12 to define cylindrically-enclosed mixing zone 30 terminating at a lower end portion of duct 20. This lower end portion itself is sized, shaped and configured to connect with and form an unimpeded passage into an upper portion of the reactor or vessel (not shown) via a connection such as with reactor flange 40 (as shown). Upline section 22 which can extend at a 0° to 90° angle relative to the downline section 24, (note the dotted line in FIG. 1 denoting such angular dispositions) has control valve 28 disposed therein at a locus remote from downline section 24.

The inner wall of downline section 24 that defines mixing zone 30 should have a smooth cylindrical surface. This inner wall can be thus be a polished metal surface or a cylindrical surface sleeve of a suitable low friction polymer such as polytetrafluoroethylene (e.g., Teflon polymer from DuPont). Preferably this inner surface of downline section 24, whether part of the wall of duct 20 itself or a sleeve suitably disposed and fastened within duct 20, preferably has a root mean square surface roughness of 0.05 millimeter or less.

The combination of conduit 10 and nozzle 12 delivers one of the concentrically aligned solution feeds to mixing zone 30. Duct 20 delivers the other of the concentrically aligned solution feeds to mixing zone 30. Control valve 14 regulates the velocity of the solution flowing to nozzle 12. Control valve 28 regulates the velocity of the solution flowing through a portion of upline section 22, thence into elbow section 26 and around a portion of the exterior of nozzle 12 disposed within elbow section 26, and then into vertical downline section 24 which defines mixing zone 30. In the preferred form depicted control valves 14 and 28 are electrically or pneumatically operated valves adapted to be operatively connected to, and to be automatically controlled by, computer 50 adapted to receive input signals from sensors such as flow meters (not shown) disposed upline from conduit 10 and duct 20, and to regulate the flows in conduit 10 and in duct 20 so as to maintain a preselected ratio of silicon to aluminum in the feeds being delivered to mixing zone 30. Thus computer 50 serves as a ratio controller that adjusts stream flows to achieve a desired preselected Si/Al ratio. Si/Al atom ratios ranging from about 0.1 to about 1.1 can be utilized depending upon the product being produced, but ratios near 1.0 are preferred. The details of such computerized control of liquid flows are well known to those of ordinary skill in the art. The ratio of the nozzle outside diameter to the inside diameter of downline section 24 can be any value less than 0.8 but preferably is about 0.5. The spray end or tip of the nozzle can be reduced to a diameter up to ⅛ of the outside diameter of the body of nozzle 12. As depicted, the spray end or tip of nozzle 12 extends at least to a point lying in a first horizontal plane above and parallel to a second horizontal plane in which the opening to the reactor lies. These planes are perpendicular or substantially perpendicular to vertical downline section 24. Nozzle 12 injects the solution from conduit 10 into mixing zone 30 at a substantially higher velocity that the velocity of the plug flow of solution entering mixing zone 30 from elbow section 26. As these solutions come together in mixing zone 30 a precrystallization mixture is formed through interaction between the sodium silicate and the alkali metal aluminate. The spray pattern itself emanating from the tip of nozzle 12 can be of any suitable pattern which provides thorough intimate mixing of the two solutions and the precrystallization mixture being formed within mixing zone 30. Preferably, the force of this spray pattern should penetrate into the contents of mixing zone to a suitable depth to ensure thorough mixing of the mixture within mixing zone 30.

One of the raw materials, preferably sodium silicate, enters the mixing zone through control valve 14 and nozzle 12. The other raw material, preferably an alkali metal aluminate, which preferably is potassium aluminate and more preferably sodium aluminate, enters mixing zone 30 via a portion of upline section 22, and elbow section 26. Both such raw material solutions are fed by forced flow means such as pumps or a source of high pressure gas (not shown) which typically are disposed respectively upline relative to conduct 10 and upline relative to upline section 22. It will be seen that nozzle 12 is positioned in a coaxial fashion (concentrically) with both downline section 24 and the entrance to the reactor such as at reactor flange 40 (as shown).

Figure 2:
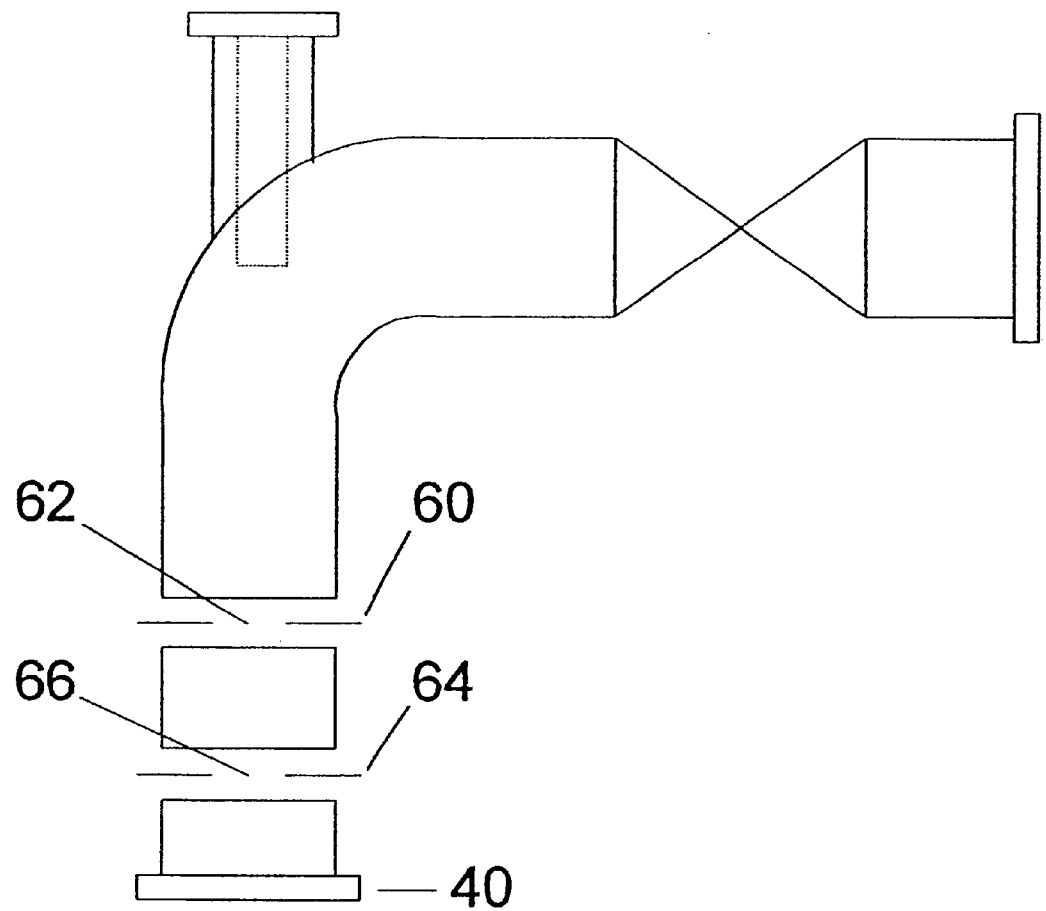
FIG. 2 schematically depicts in side view a cofeeding system that was tested but found to be inadequate.

FIG. 2 schematically depicts a cofeeding system that was tested but found to be inadequate. It will be noted that the system of FIG. 2 contains horizontal plate 60 containing primary orifice 62 and an optional horizontal plate 64 containing an secondary orifice 66. This construction is designed to cause violent mixing of the streams entering the reactor (not shown) through flange 40.

The composition of the sodium silicate stream may vary from about 1 to about 40 wt % of $SiO_2$ and from about 10 to about 25 wt % of $Na_2O$. Preferably, the sodium silicate stream contains about 25 to about 30 wt % of $SiO_2$ and about 10 to about 15 wt % of $Na_2O$. Linear velocity of the sodium silicate solution preferably entering nozzle 12 may vary from about 1 to about 100 ft/sec depending upon desired production rate and the relative dimensions of conduit 10 and duct 20. The sodium silicate stream may be fed while at a temperature in the range of about 20 to about 85° C., and preferably while at a temperature in the range of about 38 to about 45° C.

The composition of the alkali metal aluminate stream may vary from about 0.5 to about 12.5 wt % Al and should contain sufficient alkali metal hydroxide (MOH where M is any alkali metal, but preferably is K and most preferably Na) to maintain aluminum solubility. Linear velocity of the alkali metal aluminate solution preferably in duct 20 downstream from control valve 28 may vary from about 1 to about 100 ft/sec depending upon desired production rate and the relative dimensions of conduit 10 and duct 20. The alkali metal aluminate stream may be fed at a temperature in the range of about 20 to about 105° C., and preferably is in the range from about 70 to about 77° C.

As noted above, the interior of the wall defining mixing zone 30 should be smooth, and thus preferably is a polished metal surface or is a coating or installed sleeve of minimal interior surface roughness. The root mean square (rms) surface roughness of the material is preferably less than 0.05 mm. Tetrafluoroethylene (Teflon; DuPont) is a preferred material of construction for such interior surface. Such a smooth surface materially contributes to minimizing the possibility of solids formation on the walls of the mixing zone.

As indicated above, it is desirable but not essential to subject the feeds to computerized control to maintain the preselected Si/Al atom ratio entering the mixing zone. In utilizing such control, the composition of both the sodium silicate stream and alkali metal aluminate streams are determined by periodic laboratory analysis. Each stream is fed into the cofeed system through a control valve that may be operated electrically or pneumatically. Each control valve may be operated manually should the ratio control system be inoperative, or if such computer control is not utilized. Valve position detectors and valve actuators are connected to a distributive control system (DCS) centrally operated by a computer. Downstream of each control valve is a flow sensor, preferably a magnetic flow meter. The output of each flow meter is also coupled to the DCS. Based on previously input stream compositions, the DCS calculates the ratio of sodium silicate and alkali metal aluminate streams to meet a required Si/Al atom ratio in the precrystallization mixture. The DCS sends signals to both control valve actuators to maintain the proper flow rates of each stream.

An alternative control configuration may include controlling flow of only one of the two streams based on the flow of the other stream—i.e., if using computerized feed control, it is not essential that both control valves be actuated to maintain a preselected Si/Al atom ratio.

It can be seen from the above that the practice of this invention involves a continuous feed or a substantially continuous feed (i.e., slight interruptions are acceptable if they cause no harm to the operation or to the product being produced) of the solutions to a batch type crystallization reactor or vessel.

In a full-sized commercial installation crystallization reactors or vessels having a capacity of as much as 12,000 gallons, or even more, can be used. In contrast, the mixing zone is of much smaller volume. For example, a small mixing zone can be formed from a 1 foot long section of pipe having an inner diameter as small as about 2 inches. A relatively large mixing zone may be formed from a 4 foot length of pipe having an inner diameter of about 12 inches. A preferred mixing zone is formed from a 2 foot length of pipe having an inner diameter of about 6 inches.

This invention is susceptible to considerable variation in its practice. Therefore the foregoing description is not intended to limit, and should not be construed as limiting, the invention to the particular exemplifications presented or discussed hereinabove. Rather, what is intended to be covered is as set forth in the ensuing claims and the equivalents thereof permitted as a matter of law.

That which is claimed is:

1. A process of producing a synthetic zeolite, which process comprises force feeding separate aqueous solutions of sodium silicate and of an alkali metal aluminate into coaxial alignment as (i) an inner axial stream and (ii) a coaxial annular outer stream, and into a mixing zone in which the streams come together and are thoroughly mixed to produce a precrystallization mixture, the inner axial stream being injected into said mixing zone at a higher velocity than the outer stream, and having said precrystallization mixture pass as an unimpeded flow directly into a crystallization reactor or vessel.

2. A process according to claim 1 wherein the inner axial stream is the sodium silicate stream.

3. A process according to claim 1 wherein the streams entering the mixing zone are at temperatures above room temperature.

4. A process according to claim 1 wherein said streams are force fed into the mixing zone and pass from the mixing zone into the crystallization reactor or vessel (i) vertically downwardly, (ii) horizontally, or (iii) at any angle therebetween.

5. A process according to any of claims 1, 2, or 3 wherein said precrystallization mixture passes from the mixing zone into the crystallization reactor or vessel vertically downwardly, or substantially vertically downwardly.

6. A process of producing a synthetic zeolite from a sodium silicate and an alkali metal aluminate, which process comprises cofeeding a stream of an aqueous sodium silicate and an aqueous stream of an alkali metal aluminate concentrically into a vertically disposed or substantially vertically disposed cylindrical mixing zone leading downwardly directly to the top of a reactor or vessel in which the zeolite is crystallized, the cofeeding being conducted such that (i) one of said streams is an inner stream and the other stream is an outer stream, (ii) the inner stream is at a higher velocity than the outer stream, (iii) sodium silicate and alkali metal aluminate are mixed together and form a precrystallization mixture of uniform or substantially uniform composition in the mixing zone before passing into said reactor, and (iv) the resultant precrystallization mixture enters the reactor as an unimpeded flow.

7. A process according to claim 6 wherein one of said streams is injected vertically or substantially vertically downwardly into said mixing zone from a locus at or above the top of the mixing zone, and centrally disposed relative to the mixing zone.

8. A process according to claim 7 wherein the aqueous sodium silicate stream is the stream that is injected into said mixing zone.

9. A process according to claim 6 wherein said mixing zone is defined by a smooth cylindrical inner surface of the cylindrical mixing zone.

10. A process according to claim 9 wherein said inner surface has a root mean square surface roughness of 0.05 millimeter or less.

11. A process according to claim 9 wherein said inner surface is a polished metal surface.

12. A process according to claim 9 wherein said inner surface is a polytetrafluoroethylene surface.

13. A process according to claim 6 further comprising controlling the flow rates of each of said streams such that the Si:Al atom ratio in the mixing zone is in the range of about 0.1:1 to about 1.1:1.

14. A process according to claim 13 wherein said ratio is controlled to be approximately 1:1.

15. A process according to claim 6 wherein the alkali metal aluminate is sodium aluminate.

16. A process according to claim 6 wherein the stream of alkali metal aluminate has a dissolved aluminum content in the range of about 0.5 to about 12.5 wt % and an amount of alkali metal hydroxide sufficient to maintain aluminum solubility.

17. A process according to claim 6 wherein the stream of sodium silicate has a dissolved $SiO_2$ content in the range of about 1 to about 40 wt % $SiO_2$ and a dissolved $Na_2O$ content in the range of about 10 to about 25 wt %.

18. A process according to claim 6 wherein one of said streams is injected at a linear velocity in the range of about 1 ft/sec to about 100 ft/sec vertically downwardly or substantially vertically downwardly into said mixing zone from a nozzle orifice at or above the top of the mixing zone, and centrally disposed relative to the mixing zone, and wherein the other stream is introduced into the mixing zone at a linear velocity in the range of about 1 ft/sec to about 100 ft/sec.

19. A process according to claim 18 wherein said other stream is introduced into the said conduit from a duct disposed at a 0° to 90° angle relative to the downward flow of the stream that is progressing toward the nozzle orifice.

20. A process according to claim 18 wherein the aqueous sodium silicate stream is the stream that is injected from the nozzle orifice into said mixing zone.

21. A process according to claim 6 wherein the alkali metal aluminate is sodium aluminate, wherein the stream of alkali metal aluminate has a dissolved aluminum content in the range of about 0.5 to about 12.5 wt % in a sufficient amount of alkali metal hydroxide to maintain aluminum solubility, wherein the stream of sodium silicate has a dissolved $SiO_2$ content in the range of about 1 to about 30 wt % $SiO_2$ and a dissolved $Na_2O$ content in the range of about 10 to about 20 wt %, wherein the flow rates of each of said streams is controlled such that the Si:Al atom ratio in the mixing zone is in the range of about 0.1:1 to about 1.1:1, and wherein said mixing zone is defined by a smooth cylindrical inner surface of the cylindrical mixing zone.

22. A process according to claim 21 wherein the flow rates of each of said streams is controlled such that the Si:Al atom ratio in the mixing zone is approximately 1:1.

23. A process according to claim 21 or 22 wherein said inner surface has a root mean square surface roughness of 0.05 millimeter or less.

24. A process according to claim 21 or 22 wherein said inner surface is a polished metal surface.

25. A process according to claim 21 or 22 wherein said inner surface is a polytetrafluoroethylene surface.

* * * * *